United States Patent [19]
Tokano et al.

[11] Patent Number: 5,313,446
[45] Date of Patent: May 17, 1994

[54] DISC DRIVE DEVICE HAVING A HEAD CARRIAGE

[75] Inventors: Kaneyoshi Tokano, Tokyo; Sunao Kurahashi, Kanagawa, both of Japan

[73] Assignee: Canon Kabushiki Kaisha, Tokyo, Japan

[21] Appl. No.: 674,665

[22] Filed: Mar. 25, 1991

[30] Foreign Application Priority Data

Mar. 30, 1990 [JP] Japan .................................. 2-83483
Mar. 30, 1990 [JP] Japan .................................. 2-83484
Jul. 6, 1990 [JP] Japan .................................. 2-178767

[51] Int. Cl.$^5$ .............................................. G11B 21/02
[52] U.S. Cl. ........................................ 369/111; 369/215; 369/219; 360/75; 360/106; 360/109
[58] Field of Search .................... 360/75, 77.01, 77.06, 360/106, 109, 77.14, 77.15; 369/111, 233, 215, 219, 220, 223, 244

[56] References Cited

U.S. PATENT DOCUMENTS

| | | | |
|---|---|---|---|
| 4,831,615 | 5/1989 | Goto et al. | 360/106 |
| 4,996,618 | 2/1991 | Kakuda | 360/106 |
| 5,051,849 | 9/1991 | Fukushima et al. | 360/75 |
| 5,062,012 | 12/1991 | Maeda et al. | 360/75 |
| 5,097,365 | 3/1992 | Takahashi | 360/77.06 |
| 5,111,088 | 5/1992 | Fujino | 369/219 |
| 5,136,446 | 8/1992 | Yamamoto et al. | 360/106 |
| 5,189,660 | 2/1993 | Caldwell | 369/215 |
| 5,193,080 | 3/1993 | Mohri et al. | 369/215 |

Primary Examiner—Paul M. Dzierzynski
Assistant Examiner—Kim-Kwok Chu
Attorney, Agent, or Firm—Robin, Blecker, Daley & Driscoll

[57] ABSTRACT

A disc drive device has a head mounted on a head carriage with a head moving support mechanism which is capable of moving the head to the extent of one track pitch. The device is arranged to advance the head for a plurality of recording tracks on a disc-shaped recording medium at the pitch of two frame-recording tracks. At each moving position of the head carriage, the head is moved from one track position to an adjacent track by the head moving support mechanism.

16 Claims, 9 Drawing Sheets

DISC DRIVE DEVICE HAVING A HEAD CARRIAGE

BACKGROUND OF THE INVENTION

1. Field of the Invention

This invention relates to a disc drive device and, for example, to the disc drive device of a still video camera which is arranged to perform frame recording with a field head.

2. Description of the Related Art

In performing frame recording with a field head, it has been practiced, for example, to move the field head from one track to an adjacent track by means of an ordinary head advancing mechanism.

As regards a head moving arrangement for this purpose, a discrete head moving mechanism is sometimes arranged for fine tracking adjustment or for high-speed head advancing in addition to the ordinary head advancing mechanism. However, this arrangement is not aimed at an improvement in precision of a track pitch between adjacent tracks.

The still video camera uses a still video floppy disc as a recording medium. According to the standards, each track of the still video floppy disc is allowed to have a radius tolerance within a limit of 14 μm. Therefore, it must be taken into consideration that, in the worst case, a pitch error between adjacent tracks is 28 μm. If frame reproduction is performed by using a frame head under such a condition, it is hardly possible to obtain any adequate reproduction output from two adjacent frame-recorded tracks with the frame head set in the same head position, because there is more than 20 μm discrepancy in a track pitch between the adjacent tracks. Then, it is inevitable that the picture quality of the reproduced image degrades.

This can be prevented by increasing the degree of precision in pitch between the adjacent tracks at the time of recording. However, in order to increase the precision in pitch between any specific adjacent tracks, the pitch precision must be enhanced for every pair of adjacent tracks. In other words, it is necessary to control and ensure pitch precision of each of 49 track pitches in addition to the control over absolute track precision.

Further, in a case where a head advancing mechanism is arranged to advance the head by only one track at a time and the head is advanced over all the tracks by this mechanism, errors are accumulated every time the head is moved. Therefore, in order to meet the requirement for absolute track precision, the pitch precision must be guaranteed in the order of sub-microns.

To meet both the requirements for the absolute track precision and the pitch precision between adjacent tracks, it is necessary to have more controlled management for precision. Then, it incurs difficulties in terms of manufacture and usage.

In respect of the track advancing control method for accurately positioning the head at each of the tracks formed on a disc-shaped recording medium, the conventional still video camera system has been arranged as follows: a frame-recording image is recorded by recording two field images separately in adjacent tracks. In reproducing the frame-recording image by means of a field head, signals are read by moving the head to the two adjacent tracks one after another. In order to position the head for each of the tracks, the so-called ATF (automatic track finding) control is performed. Under the ATF control, a reproducing head is positioned in such a point at which the output of the reproducing head reaches its maximum value. An advantage of this method lies in that, a stable, high reproduction output is obtainable even if the degree of advancing precision of the head advancing mechanism is relatively low.

FIG. 4 is a graph for explaining the operation of the ATF control. The axis of abscissa shows the head advancing position. The axis of ordinate shows the output of the head. The head is assumed to be moved from one track to another track. Then, assuming that the head is first moved to a position A which is close to the desired track (a maximum output position), for example, the output of the head obtained at the position A is stored. After that, the head is moved to a very small extent (fine advancing), and an output thus obtained is compared with the previously stored output. This action is repeated for different head positions, in the sequence of positions A - B C - D - E, until the output of the head obtained at the current position becomes smaller than the output obtained at the immediately preceding position. Then, the output obtained at the immediately preceding position is subjected to a reproduction process. In obtaining the head output by the fine advancing of the head, at least a period of time corresponding to one rotation of the disc, i.e., 1 V (V: a vertical scanning period) is necessary. Since the period of 1 V is necessary in reading a recorded signal, a total period of 8 V is necessary for obtaining a reproduction output in the case of FIG. 4.

FIG. 5 shows a case where the head happens to be brought by the first step of the head advancing action to a point at which the output of the head becomes a maximum value. A total period of 6 V is necessary even in this case, because the head must be still moved in the sequence of positions A - B - C - D.

In a case where a frame-recording image is to be reproduced with a field head, the above-stated head advancing and positioning mechanism requires an excessively long period of time for obtaining the reproduced image, because the ATF control action must be performed twice.

SUMMARY OF THE INVENTION

This invention is directed to the solution of the above-stated problem of the prior art. It is, therefore, a first object of this invention to provide a disc drive device which is arranged to improve both the absolute track precision of the head for the tracks formed on a disc-shaped recording medium and the pitch precision between adjacent tracks.

It is a second object of the invention to provide a disc drive device which is arranged to be capable of accurately and speedily shift the head position to a desired track in reproducing a frame-recording image with a field head.

It is a third object of the invention to provide a disc drive device which is arranged to make a head moving distance always constant in moving the head from an arbitrary track to the adjacent track and thus to give a constant pitch between adjacent tracks.

It is a fourth object of the invention to provide a disc drive device which is simply arranged to be capable of making the pitch of tracks between an arbitrary track and a track adjacent to it always constant, so that both the absolute track precision and pitch precision between any arbitrary adjacent tracks can be adequately attained, and also to permit recording, without using a frame head, on a recording medium a signal which can be reproduced by a frame head in a stable state and with a sufficient intensity.

To attain this object, a disc drive device arranged as a preferred embodiment of this invention is characterized in that the head is mounted on a head carriage with a moving member which is arranged to be capable of occupying any of two positions spaced at a distance corresponding to one track pitch of a recording medium.

It is a fifth object of the invention to provide a track advancing control method for speedily reproducing a frame-recording image with a field head and a disc drive device which is arranged to carry out this method.

It is a sixth object of the invention to provide a disc drive device which is capable of reproducing, by performing the ATF control only once, a frame-recording image recorded in two adjacent tracks in reproducing the frame-recording image with a field head.

It is a seventh object of the invention to provide a disc drive device which is arranged to shorten a length of time required for the ATF control by as much as one performance thereof to quickly give a reproduction output in reproducing a frame-recording image with a field head and to limit the shift of the head to an adjacent track, so that the output of the head can be prevented from lowering too much.

To attain that object, a disc drive device arranged as a preferred embodiment of this invention is characterized in that no ATF control is performed in shifting the head to an adjacent track from a track for which the head has been positioned by the ATF control.

It is an eighth object of the invention to provide a disc drive device which is capable of accurately and speedily moving a recording/reproducing head over a rotary recording medium by a given distance in the radial direction of the rotary recording medium.

It is a ninth object of the invention to provide a disc drive device whereby, if the groove of a lead-screw bar which is provided for driving a head carriage has a play corresponding to one track pitch, a head can be instantly moved from one track to a track adjacent thereto; the head can be positioned on the adjacent track with a sufficient degree of precision if the width of the play is provided with a sufficient degree of manufacturing precision; and, therefore, the head can be moved at a sufficiently high speed and sufficient positioning accuracy.

It is a tenth object of the invention to provide a disc drive device which is of a very simple structural arrangement and yet is capable of moving a head to a given distance point at a high speed.

To attain this object, a disc drive device arranged as a preferred embodiment of this invention to move a carriage supporting a head by means of a rotary-to-linear conversion mechanism which consists of a lead-screw bar and a pin inserted into the groove of the lead-screw bar is characterized in that: the groove of the lead-screw bar is provided with a play for a predetermined distance relative to the pin; and a biasing mechanism is arranged to bias the pin selectively to one of two end faces within the groove of the lead-screw bar in the axial direction of the lead-screw bar.

These and other objects and features of this invention will become apparent from the following detailed description of embodiments thereof taken in conjunction with the accompanying drawings.

DETAILED DESCRIPTION OF THE PREFERRED EMBODIMENTS

Figure 1A:
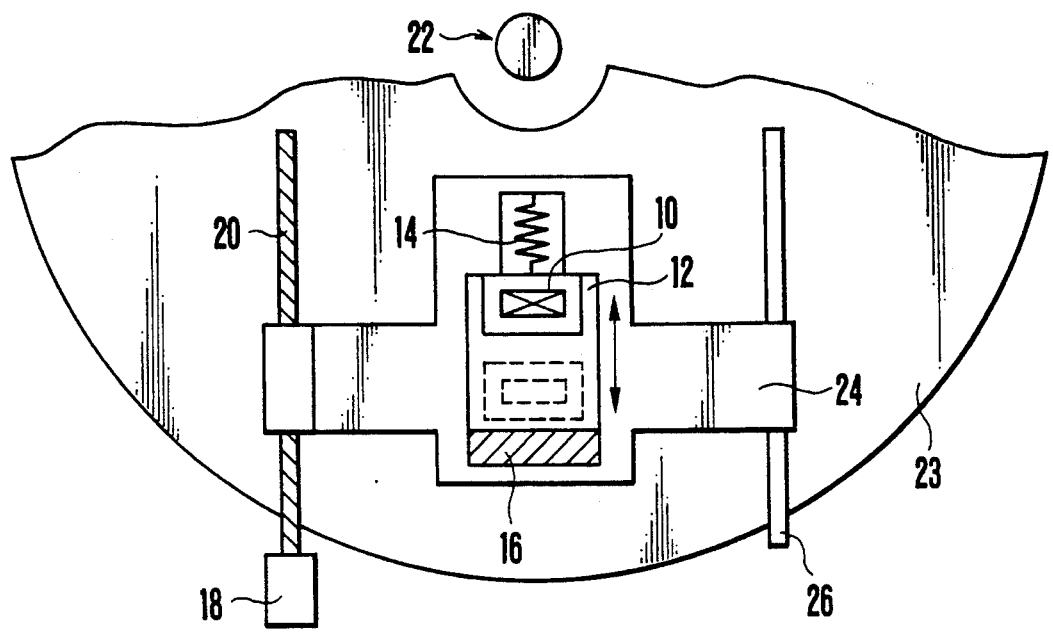
FIG. 1(A) shows the arrangement and operation of a head advancing mechanism arranged according to the invention.

The following describes by way of example some embodiments of this invention with reference to drawings:

FIG. 1(A) shows in outline the arrangement of an embodiment of this invention. The illustration includes a field head 10; a head support member 12 which is arranged to support the field head 10; an urging spring 14; an electromagnet 16; a driving motor 18; a lead-screw bar 20 which is arranged to be rotated by the driving motor 18; the rotary shaft 22 of a spindle motor which is arranged to rotate a still video floppy disc 23; a carriage 24 which is arranged to convey, by the rotation of the lead-screw bar 20, the field head 10, the head support member 12, the urging spring 14 and the electromagnet 16 altogether in the radial direction of the still video floppy disc 23; a guide bar 26 which is arranged in parallel with the lead-screw bar 20 to guide the carriage 24.

When no current is applied to the electromagnet 16, the field head 10 and the head support member 12 on the carriage 24 are pulled together to the inner circumference side of the floppy disc 23 by the urging spring 14. However, when a current is applied to the electromagnet 16, the head 10 and the head support member 12 are moved toward the outer circumference side of the floppy disc 23 against the force of the urging spring 14 as much as a given distance, i.e., a distance corresponding to one track pitch (100 μm, for example).

In the case of normal track advancing, the lead-screw bar 20 is rotated by the driving motor 18 to move the carriage 24, i.e., the field head 10, in the radial direction of the floppy disc 23.

Whereas, in performing frame recording, the head 10 is first advanced in a normal manner to one of two recording tracks, and the recording is performed for one of two fields of a frame-recording image. After that, a current is applied to the electromagnet 16. With the electromagnet 16 thus energized, the head 10 is moved against the urging spring 14 toward the outer circumference side of the floppy disc 23 as much as a distance which corresponds to one track pitch. In this new head position, the other field of the frame-recording image is recorded and, after that, the power supply to the electromagnet 16 is brought to a stop. The head 10 and the head support member 12 are brought back to their original positions by the force of the urging spring 14.

In the case of this embodiment, the track pitch for the frame recording corresponds to a distance over which the head 10 and the head support member 12 are moved on the carriage 24, and is arranged to be always constant.

Figure 1B:
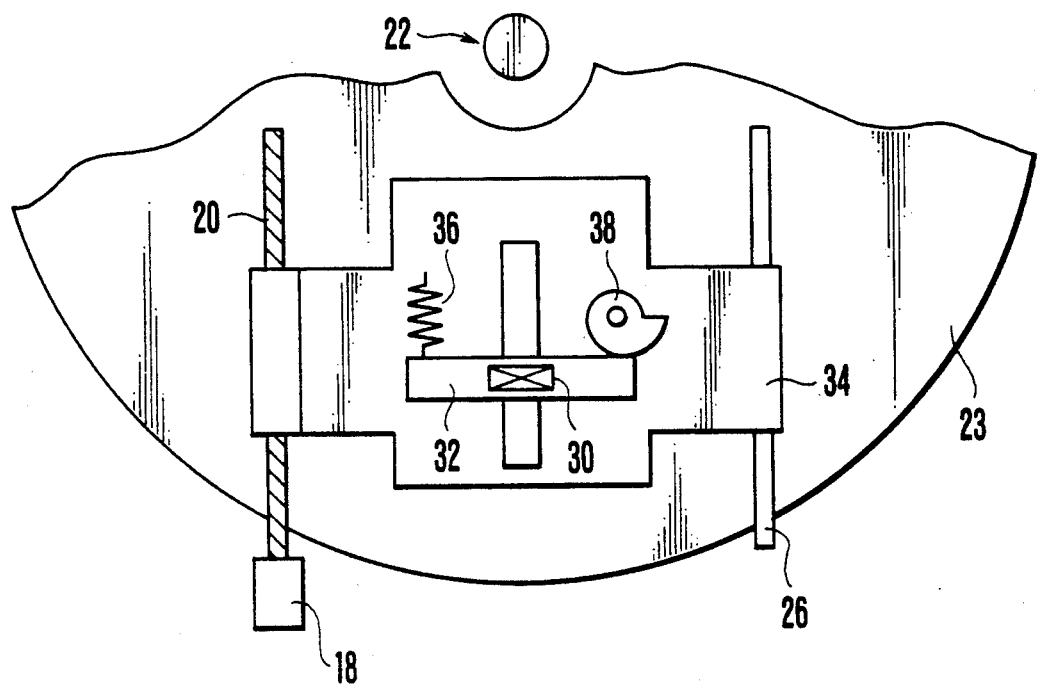
FIG. 1(B) shows a head advancing mechanism arranged as a second embodiment of the invention.

FIG. 1(B) shows in outline the arrangement of a second embodiment of this invention. In FIG. 1(B), the same component parts as those of FIG. 1(A) are indicated by the same reference numerals. The illustration includes a field head 30; a head support member 32 which is arranged to support the field head 30; a carriage 34 which is arranged to convey the head 30 and the head support member 32 in the radial direction of the floppy disc 23; an urging spring 36 which is arranged to urge the head 30 and the head support member 32 toward the inner circumference side of the floppy disc 23; and a cam 38 which is provided for moving the head 30 and the head support member 32 toward the outer circumference side of the floppy disc 23 as much as a distance corresponding to one track pitch against the force of the urging spring 36.

In the case of the second embodiment shown in FIG. 1(B), after completion of recording one field of a frame-recording image, the cam 38 is caused to rotate to move the head 30 and the head support member 32 against the force of the urging spring 36 toward the outer circumference side of the floppy disc 23 as much as one track pitch. The other field of the frame-recording image is then recorded at the new position thus obtained. Upon completion of the recording, the cam 38 is caused to further rotate to bring the head 30 and the head support member 32 back to their original positions by means of the urging spring 36.

In accordance with the arrangement of the second embodiment shown in FIG. 1(B), the track pitch between adjacent tracks can be also kept constant.

Figure 2A:
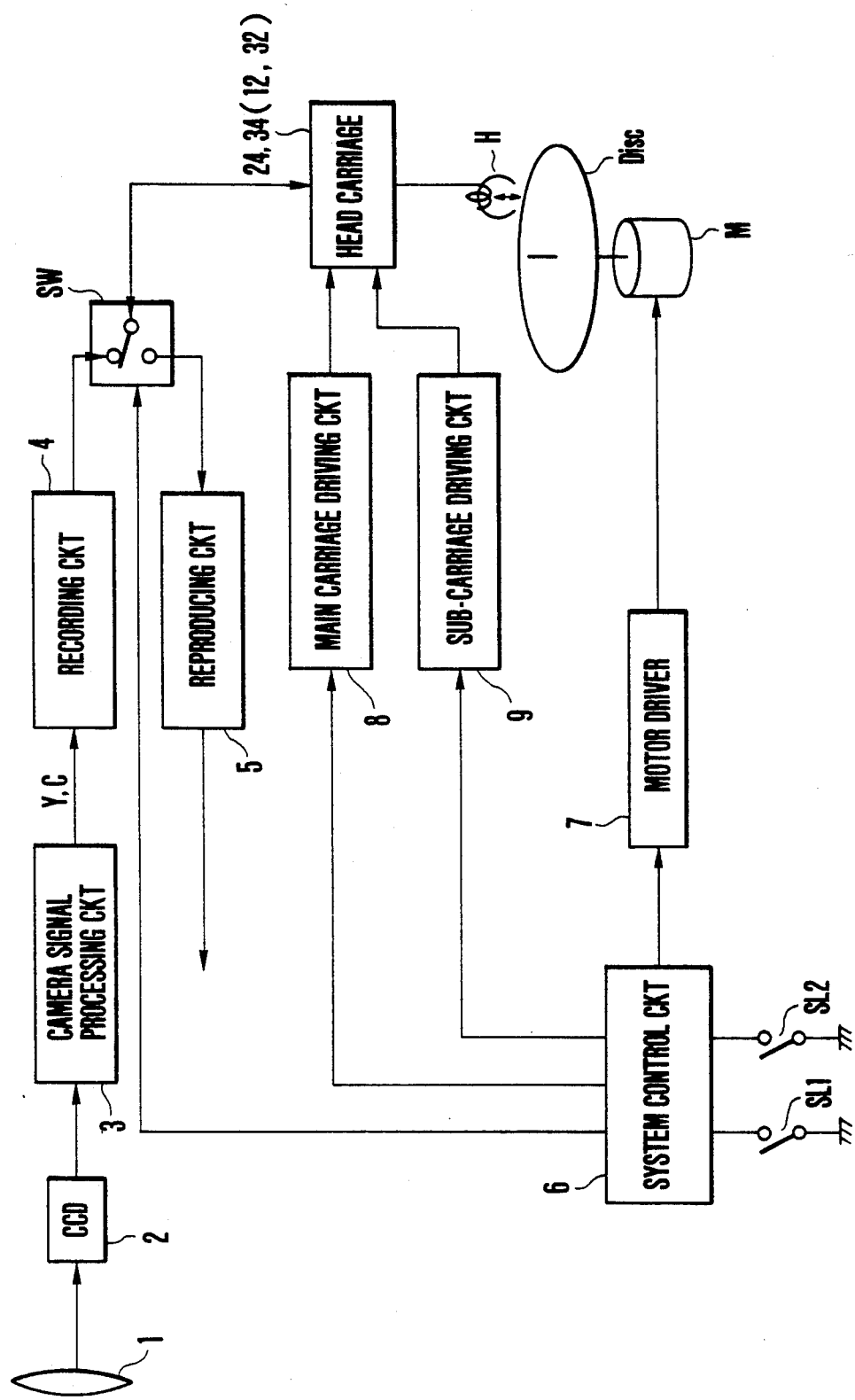
FIGS. 2(A) and 2(B) are a block diagram and a flow chart showing the arrangement and the operation of a control circuit respectively.

FIG. 2(A) is a block diagram showing a still video camera including the head advancing mechanism which is arranged as shown in FIG. 1(A) or 1(B). In FIG. 2(A), reference numeral 1 denotes a photo-taking lens optical system. An image sensor 2 which is a CCD or the like is arranged to photo-electrically convert the image of an object formed by the photo-taking lens optical system 1 and to produce an image signal. A camera signal processing circuit 3 is arranged to perform a given signal processing action on the image signal output from the image sensor 2 and to produce a luminance signal Y and a chrominance signal C. A recording circuit 4 is arranged to carry out predetermined processes such as an emphasis process, a frequency modulation process, etc., on the luminance signal Y and the chrominance signal C output from the camera signal processing circuit 3 to convert them into a signal form suited for recording on a magnetic disc and to supply its output to a head H. A reproducing circuit 5 is arranged to carry out a frequency demodulation process, a deemphasis process, etc., on a signal reproduced by the head H to bring the reproduced signal into the original video signal and to supply the reproduced video signal to a monitor or the like which is not shown.

A reference symbol SW denotes a recording-reproduction change-over switch. The switch SW is arranged to select the recording circuit 4 or the reproducing circuit 5 in accordance with a control signal output from a system control circuit 6. The system control circuit 6 is arranged to control the whole system of the still video camera and is composed of a microcomputer, etc. A motor driver 7 is arranged to rotatively drive a disc rotating motor M in accordance with an instruction given from the system control circuit 6. A main carriage driving circuit 8 is arranged to drive the carriage 24 or 34 of FIG. 1(A) or 1(B) in accordance with an instruction given from the system control circuit 6. A sub-carriage driving circuit 9 is arranged to drive, also in accordance with an instruction from the system control circuit 6, the head support member 12 or 32 mounted on the carriage 24 or 34.

Switches SL1 and SL2 are arranged to be closed by the first and second steps of stroke of pushing operation on a shutter release switch, respectively.

Figure 2B:
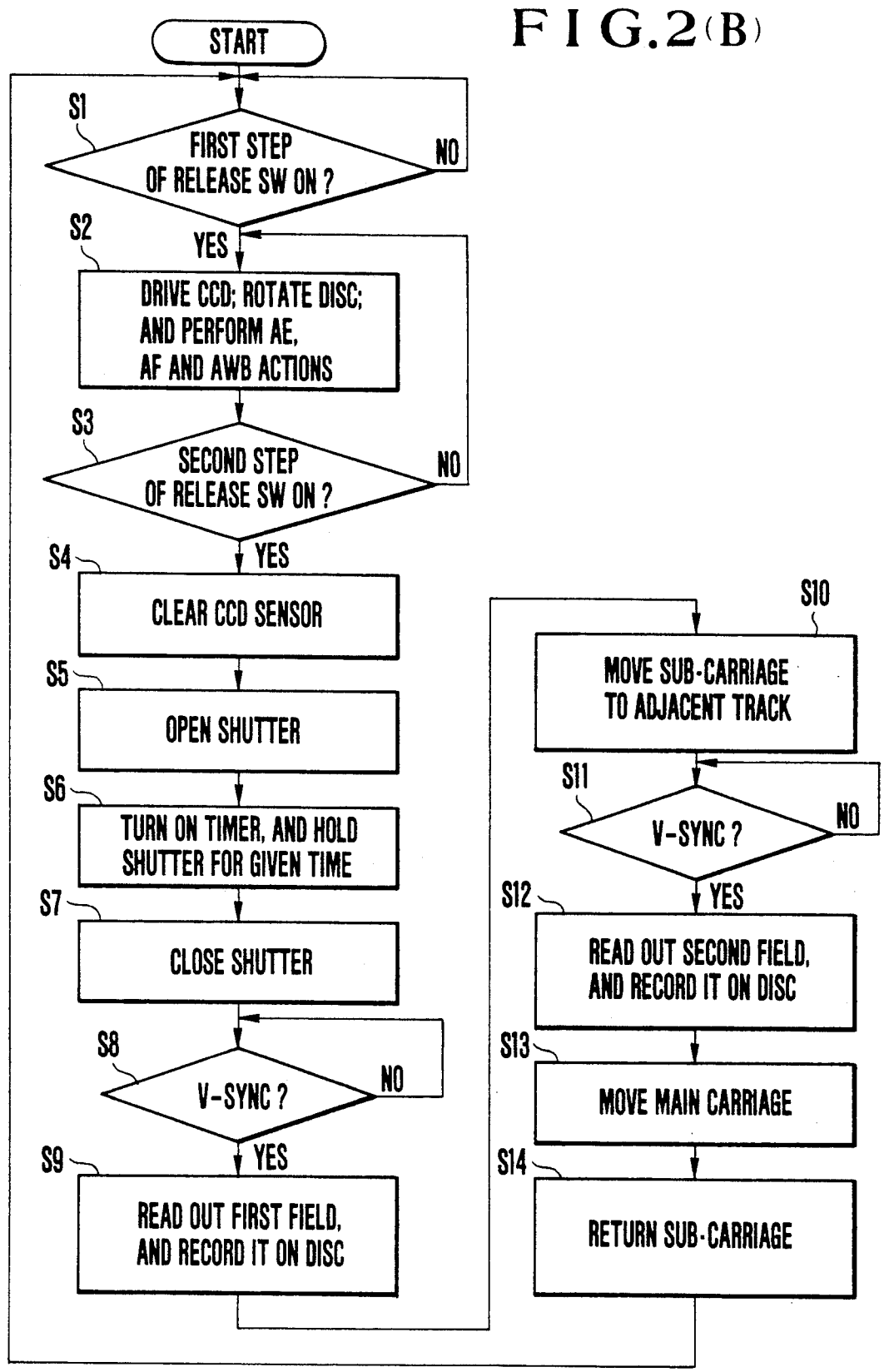

FIG. 2(B) is a flow chart showing the operation of the camera shown in FIG. 2(A). The flow of operation is described below on the assumption that the power supply of the camera has already been turned on and that the head has already been set in its initially set position for an unrecorded track with the power supply turned on:

After commencement of the operation, the flow waits for the first step of pushing operation on the release switch at a step S1. When the release switch is pushed to a first step point, the flow proceeds to a step S2. At the step S2: The motor M is driven to rotate the disc. The image sensor 2 is driven to begin to take in an image. An AE (automatic exposure) circuit, an AF (automatic focusing) circuit and an AWB (automatic white balance) circuit which are not shown are driven into a stand-by state before shooting.

When the release switch is pushed to its second step point at a step S3, the flow comes to a step S4. At the step S4: The image sensor 2 is cleared. At a step S5: A shutter which is not shown is caused to open. At a step S6: A timer for a given period of time is operated to allow the shutter to be opened for the given period of time. At a step S7: The shutter is closed. An exposure thus comes to an end. At a step S8: The flow waits for arrival of a vertical synchronizing (hereinafter referred to as V-sync) signal. At a step S9: A signal for the first field which is accumulated by the image sensor 2 is read out. Then, after completion of a predetermined processing action on the signal, the signal is recorded in a recording track on the disc. After completion of recording the first field the flow comes to a step S10. At the step S10: The sub-carriage driving circuit 9 is driven to move only the head support member 12 or 32 to an adjacent track, without moving the head carriage 24 or 34. At a step S11: The flow waits for arrival of the V-sync signal. Upon arrival of the V-sync signal, the flow proceeds to a step S12. At the step S12: A signal for the second field is read out. The second field is subjected to the predetermined processing action and is recorded in a recording track on the disc. After completion of this, the flow proceeds to a step S13. At the step S13: The main carriage driving circuit 8 is driven to move the head carriage 24 or 34 to the next unrecorded track. At a step S14: The sub-carriage 12 or 32 is brought back to its previous state and, after that, the flow comes back to the step S1 to wait for a next shot. As for a reproducing operation, it will be described for a third embodiment which will be described later.

As apparent from the above description, in accordance with this invention, the first or second embodiment which is arranged in a simple manner is capable of making the track pitch between any desired track and another track adjacent to it always constant. Therefore, despite of a simple structural arrangement, both the absolute track precision and the precision of pitch between arbitrary adjacent tracks can be adequately attained. Further, without recourse to a frame head, the signal can be recorded on the recording medium in such a way as to permit reproduction by a frame head to give a stable, sufficiently strong reproduction output.

Incidentally, while, in the above embodiments, a description is made about a case where frame recording is performed by using a field head, the invention may be applied to a system which performs recording in units of four tracks by using a frame head. In other words, the invention is suitable for a case where recording is performed on a relatively large recording area by using a relatively small head.

Next, a disc drive device which is arranged as the third embodiment of this invention to carry out a track advancing control method for accurately positioning the head at each of the recording tracks of a disc-shaped recording medium is described as follows:

In reproducing, for example, a frame-recording image by means of a field head, the third embodiment permits speedy reproduction of the recorded image with the ATF control carried out in a manner suited for the head advancing mechanism of the device.

Figure 3:
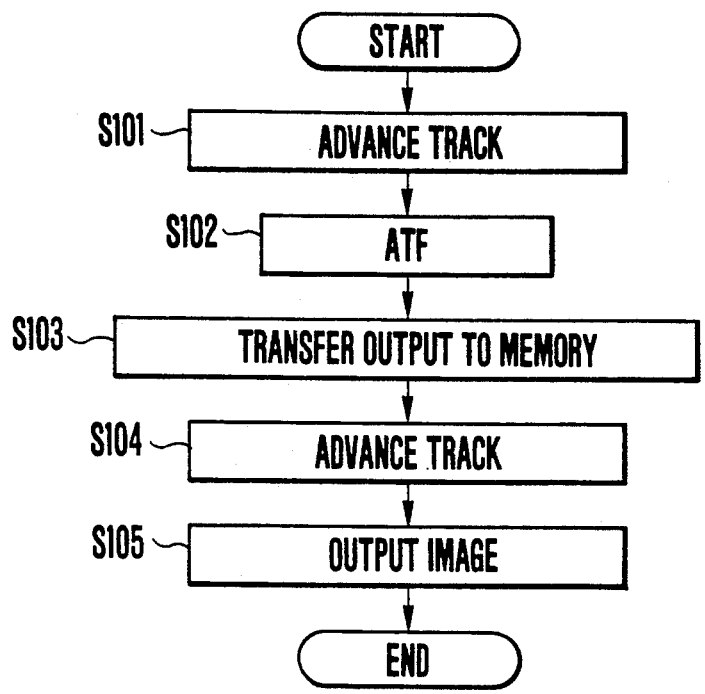
FIG. 3 is a flow chart showing the operation of a head position control device arranged as a third embodiment of the invention.
Figure 4:
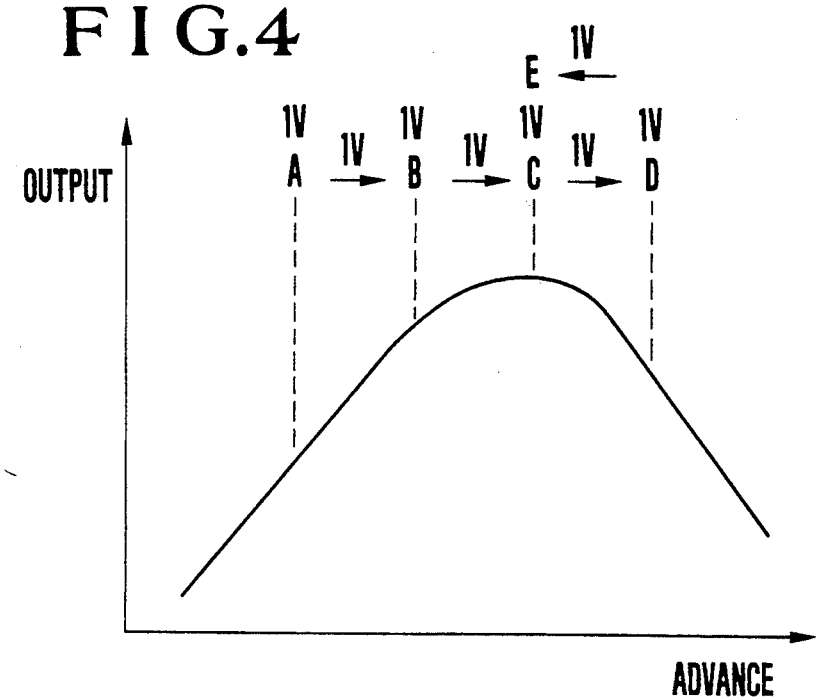
FIGS. 4 and 5 respectively show ATF actions.
Figure 5:
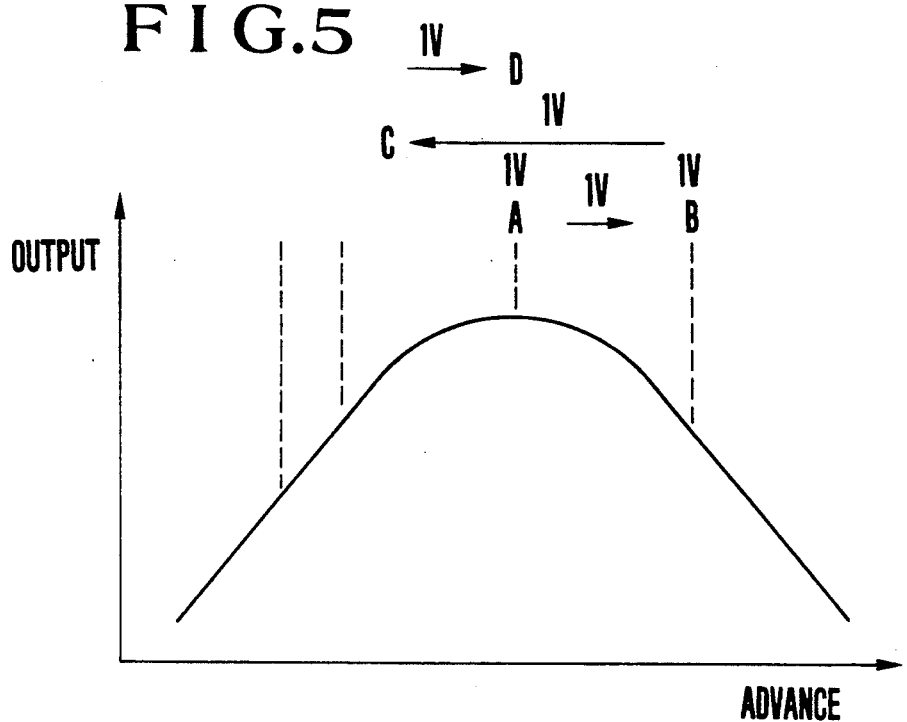
Figure 6:
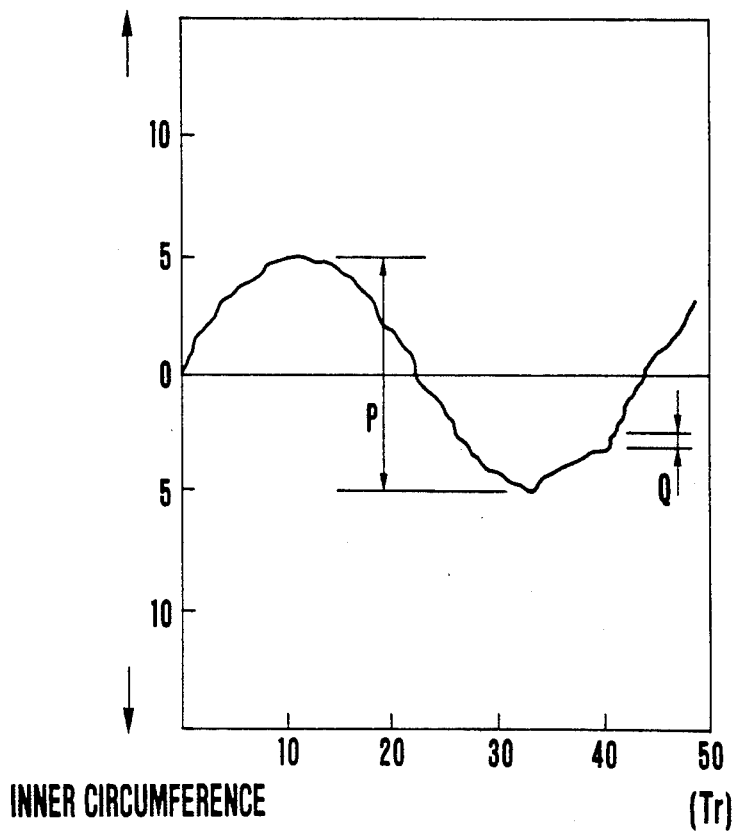
FIG. 6 is a graph showing the action of a head position control cam.

In accordance with the track advancing control method of the third embodiment, the ATF control is not performed in cases where the head is to be moved to an adjacent track from a track at which the head has been positioned under the AFT control, so that reproduction can be speedily accomplished. The following describes the details of the third embodiment with reference to drawings;

FIG. 3 is a flow chart showing the operation of the third embodiment. The head advancing mechanism of the kind arranged to be capable of advancing the head in a stepless manner uses a cam or a lead-screw bar. The advancing precision of the mechanism is considered to be as follows: FIG. 6 shows the track precision attained by the ordinary advancing mechanism of the kind using a cam. As shown, a curve representing the track advancing precision is continuous. The curve is smooth if the cam face is smoothly finished.

Referring to FIG. 6, a reference symbol P denotes an overall degree of track precision. A symbol Q denotes pitch precision between adjacent tracks. Compared with the overall degree of precision, the pitch precision between adjacent tracks can be considered easier. Therefore, the ATF control is considered to be safely omissible in moving the head from one track to an adjacent track.

However, although the pitch precision between adjacent tracks is excellent, if the head is repeatedly moved without the ATF control, an allowable degree of error would accumulate to degrade the precision as long as the pitch precision includes any degree of error. To prevent the error from accumulating, it is necessary to have any previous error canceled immediately before commencement of track advancing without the ATF control. The problem is soluble by limiting the omission of the ATF control to a track located adjacent to a track for which the ATF control has been performed.

In view of the above, the third embodiment is arranged to operate by steps, as shown in FIG. 3, in reproducing a frame-recording image with a field head in the following manner: in performing the track advancing for reproduction of a first field (at a step S101), the ATF control is performed (at a step S102). At a step S103: A reproduction output is transferred to a memory. At a step S104: The head is moved to an adjacent track for reproduction of a second field while omitting the ATF control. At a step S105: A reproduced image is output.

As apparent from the description given above, the third embodiment is arranged to permit a frame-recording image to be speedily reproduced by a field head.

The following describes the arrangement of the head advancing mechanism of a disc drive device as a fourth embodiment of this invention.

A disc drive device of the kind being used by a still video camera for rotating a disc-shaped recording medium and allowing a recording/reproducing head to perform recording and/or reproduction is arranged as follows: signals are recorded in a plurality of tracks which are concentrically arranged on the disc. The recording density depends on the head positioning accuracy of the head advancing mechanism which is arranged to move the recording/reproducing head in the radial direction of the magnetic disc. The recording/reproducing speed depends on the head advancing speed.

For example, the electronic still camera is arranged to record a video signal for one field in one track and, in the case of a frame-recording image, to use two adjacent tracks. Therefore, in cases where a single magnetic head is arranged to be used for frame recording and also for frame reproduction, the magnetic head must be moved and positioned to an adjacent track within a limited period of time other than the time for video image part of the field video signal.

In view of this, a disc drive device that has been proposed for the conventional electronic still camera is arranged to move the magnetic head at a high speed between adjacent tracks. However, the arrangement for precisely positioning the magnetic head at an adjacent track requires the use of many parts. Besides, it necessitates adjustment work on many parts. The prior art arrangement, therefore, presents a problem in terms of reduction in size and cost.

This problem exists in common with the drive devices for opto-magnetic discs and optical discs. Therefore, in the present specification, each of the recording, reproducing and erasing magnetic heads or photo-pickups is hereinafter called the recording/reproducing head or simply as the head.

The fourth embodiment of this invention is capable of precisely and speedily moving the recording/reproducing head as much as a given distance in the radial direction of a rotary recording medium. The embodiment is arranged to move a head supporting carriage by a rotary-to-linear conversion mechanism which consists of a lead-screw bar and a pin which is inserted into the groove of the lead-screw bar. The groove of the lead-screw bar is arranged to have a play to a given distance relative to the pin. A biasing mechanism is arranged to selectively bias the pin to one of the two inner end faces of the groove in the axial direction of the lead-screw bar. If the distance of play of the groove of the lead-screw bar corresponds to one track pitch, the head can be instantly moved from one track to an adjacent track. If the groove is manufactured to have a precise width of the play, the head can be positioned over the adjacent track with a sufficient degree of precision. Therefore, the embodiment has a sufficient head moving speed with an adequate degree of head positioning precision.

Figure 7:
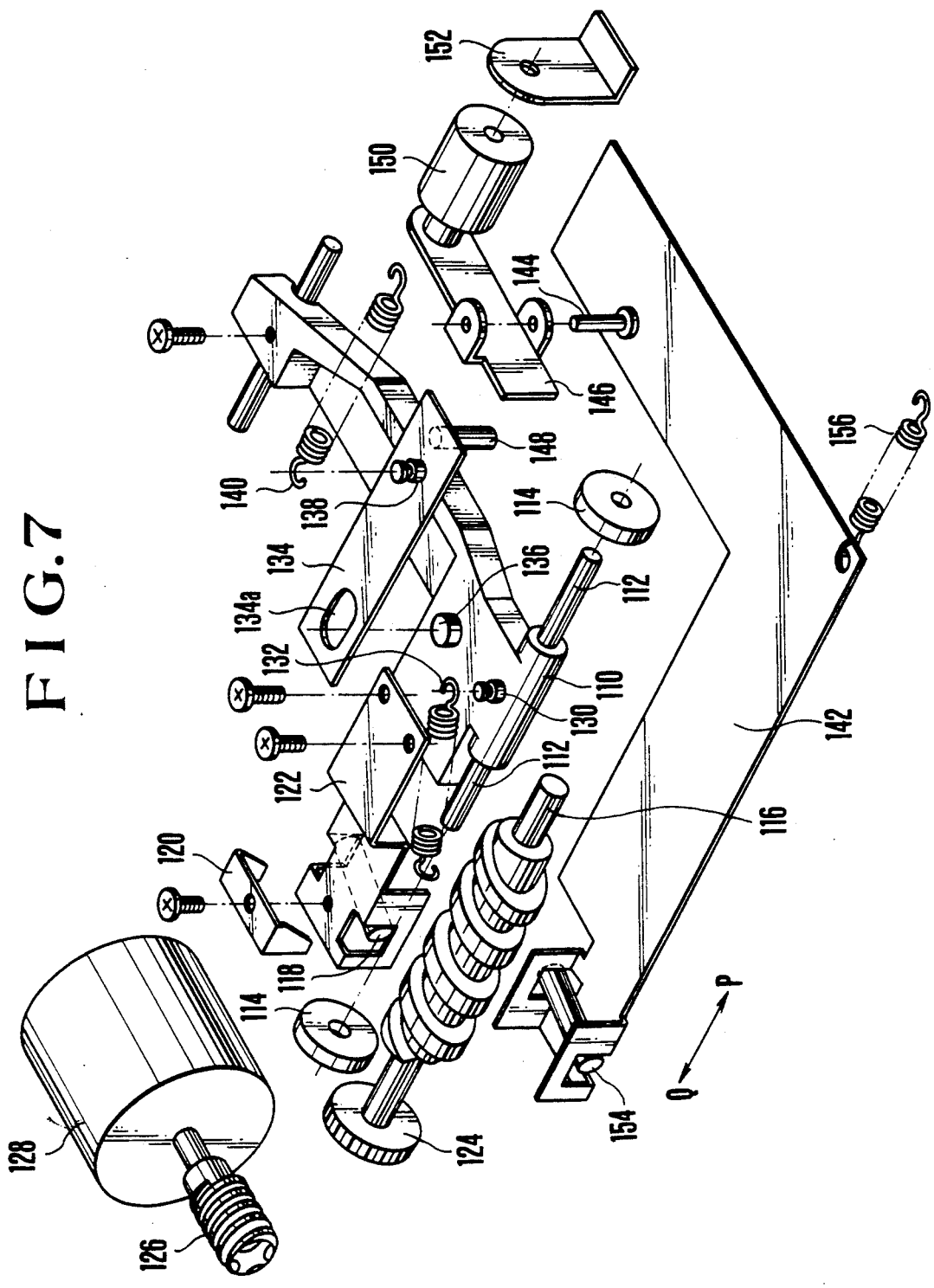
FIG. 7 is an oblique view showing the head advancing mechanism of a disc drive device which is arranged as a fourth embodiment of the invention.
Figure 8:
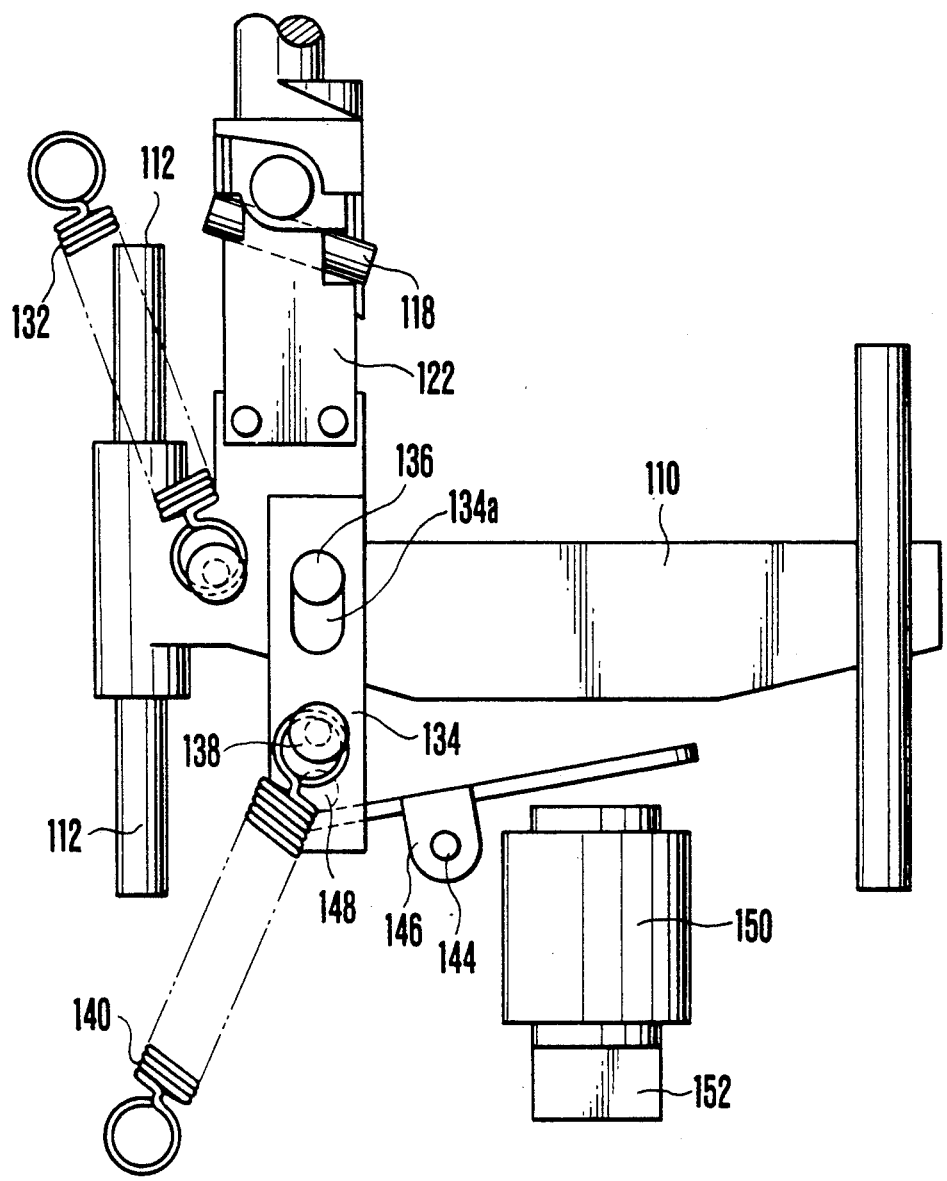
FIG. 8 is a plan view showing the essential parts of the head advancing mechanism of FIG. 7.
Figure 9:
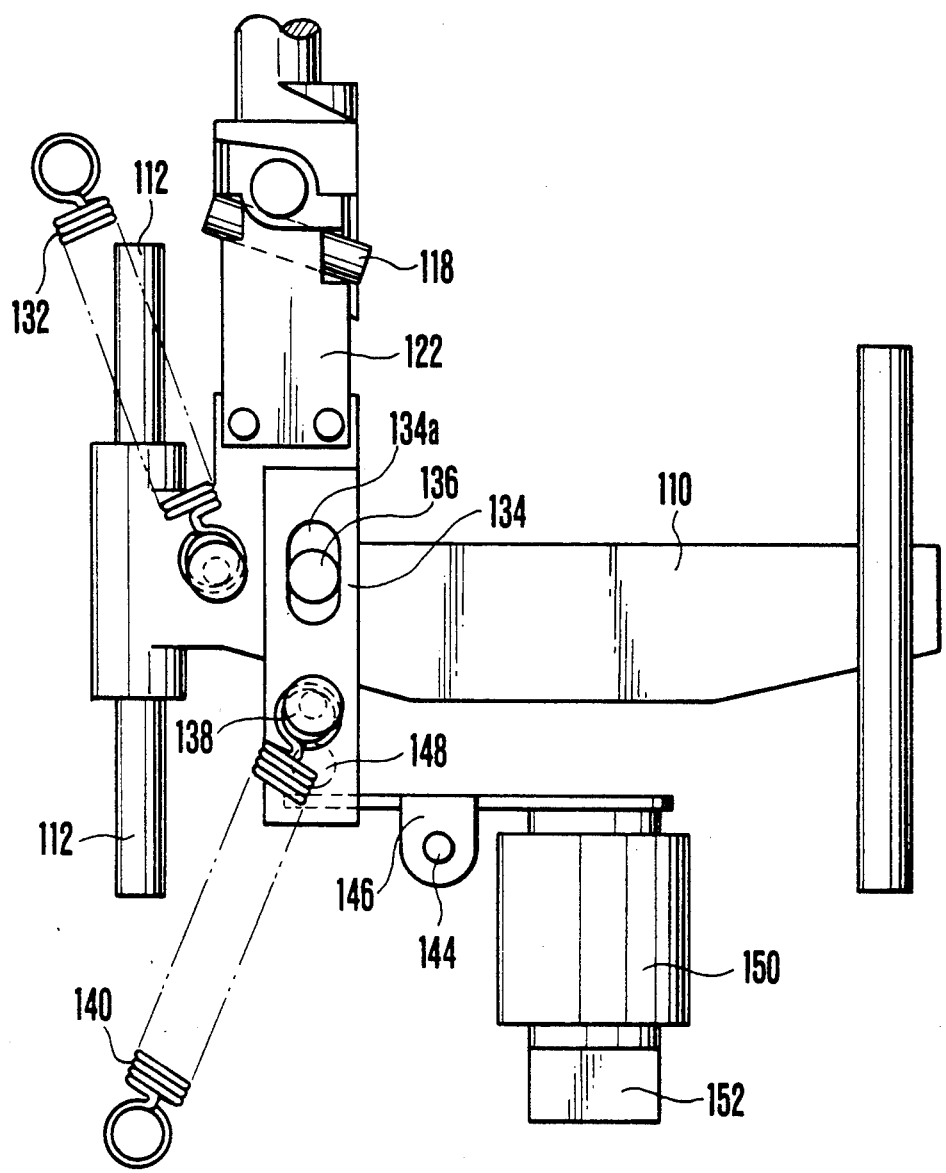
FIG. 9 is a plan view showing also the essential parts of the same head advancing mechanism.

FIG. 7 is an exploded oblique view of the electronic still camera to which the fourth embodiment of the invention is applied. FIGS. 8 and 9 are plan views showing in part the arrangement of the same camera. Referring to these figures, a carriage 110 has a magnetic head of one channel secured thereto (not shown). Shafts 112 which are secured to the carriage 110 extend from both ends of the carriage 110. These shafts 112 are inserted into bearings 114. These bearings 114 are secured to a box-shaped frame which is not shown. The carriage 110 is thus supported in a state of being slidable in the directions of the shafts 112. A lead-screw bar 116 is rotatably mounted on the box-shaped frame which is not shown. A pin 118 engages a groove provided in the lead-screw bar 116. The pin 118 is secured to a connection plate 122 by means of a leaf spring 120. The connection plate 122 is secured to the carriage 110. A worm wheel 124 is secured to the lead-screw bar 116. A worm gear 126 which engages the worm wheel 124 is secured to the rotation shaft of a stepper motor 128.

A spring peg 130 is secured to the carriage 110. A spring 132 has one end thereof secured to the spring peg 130 and the other end to the box-shaped frame which is not shown. The spring 132 is thus arranged to urge the carriage 110 in the direction of arrow Q as shown in FIG. 7. A slide plate 134 is arranged above the carriage 110 in parallel to the carriage 110. A pin 136 of the carriage 110 is inserted into a slot 134a formed in the slide plate 134. The slot 134a oblongly extends in the directions of arrows P and Q. The slide plate 134 is thus arranged to be slidable in the directions of arrows P and Q within the limits of the slot 134a. A spring peg 138 is erected on the slide plate 134. A spring 140 is set between this spring peg 138 and the box-shaped frame which is not shown. The spring 140 is arranged to urge the slide plate 134 in the direction of arrow P and to have a stronger force than the spring 132.

An interlocking plate 142 is interlocked with the carriage 110 in a manner which will be described later. An armature 146 is rotatably mounted on a shaft 144 which is erected on the interlocking plate 142. The armature 146 is set in a position to interfere with a pin 148 which is erected on the lower side of the slide plate 134. An electromagnet 150 is secured via a support plate 152 to the interlocking plate 142. A pin 154 which is secured to the interlocking plate 142 is inserted into the groove of the lead-screw bar 116. A spring 156 is arranged to urge the interlocking plate 142 in the direction of arrow P.

The fourth embodiment which is arranged as described above operates as described below, for example, in recording a frame image by recording the video signal of the first field in one track and the video signal of the second field in an adjacent track.

In the first place, the stepper motor 128 is caused to rotate for the purpose of moving the head to a desired track position. The rotation of the motor 128 causes the lead-screw bar 116 to rotate through the worm gear 126 and the worm wheel 124. The pins 118 and 154 which are inserted in the groove of the bar 116 then move in the direction of arrow P or Q. Since the pin 118 is arranged in one body with the carriage 110, the carriage 110 also moves in the same direction. Further, since the other pin 154 is secured to the interlocking plate 142, the plate 142 also moves in the direction of arrow P or Q in a state of being interlocked with the carriage 110. Therefore, the positional relation of the armature 146 mounted on the interlocking plate 142 to the carriage 110 remains unchanged despite of the rotation of the stepper motor 128.

Figure 10:
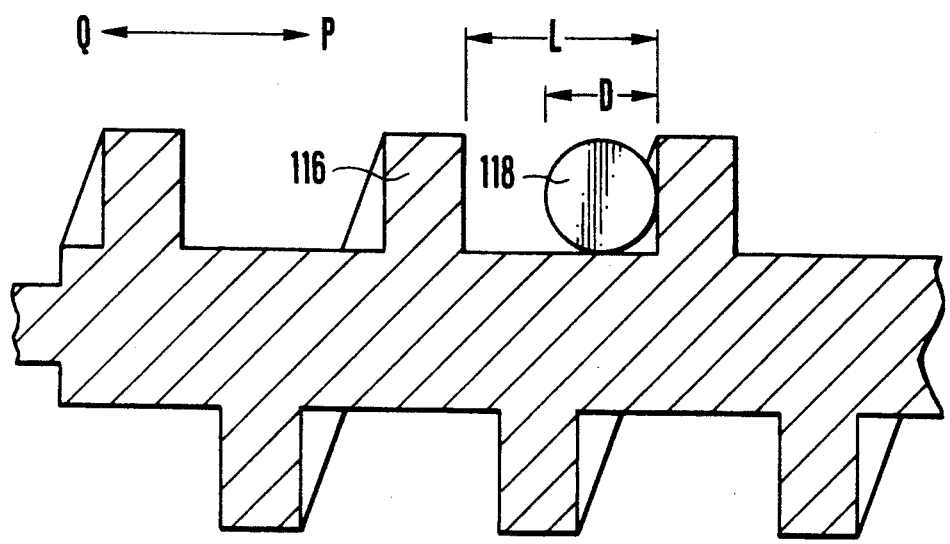
FIGS. 10 and 11 respectively show a positional relation between a lead-screw bar and a pin disposed on the side of a head carriage.

FIG. 8 shows in a plan view a condition obtained when the head is brought to the desired track position by the rotation of the stepper motor 128. Under this condition, the carriage 110 is being urged in the direction of arrow P by the engagement of the pin 136 with the slot 134a of the slide plate 134 and by the force of the spring 140. The positional relation of the groove of the lead-screw bar 116 to the pin 118 is as shown in FIG. 10. Referring to FIG. 10, a reference symbol L denotes the width of the groove of the lead-screw bar 116 in the axial direction thereof. A symbol D denotes the diameter of the pin 118 as viewed in the axial direction of the lead-screw bar 116. The dimension of the width L and that of the diameter D are determined in such a way as to make the difference between them (L−D) coincide with one track pitch. When a release button which is not shown is pushed under this condition, the first field video signal of an image resulting from a shot is recorded in the track at which the head is currently located.

Figure 11:
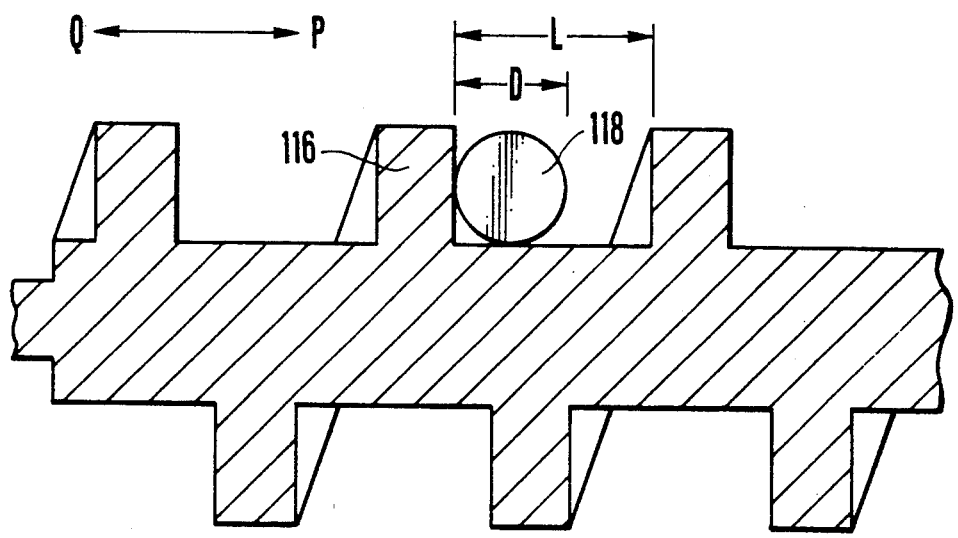

After completion of recording of the first field video signal, a current is applied to the electromagnet 150. This causes the armature 146 to be pulled and turned clockwise around a shaft 144 as shown in FIG. 8. Then, the pin 148 is pushed in the direction of arrow Q. The pin 136 is set free within the slot 134a, as shown in FIG. 9. As a result, the urging force of the spring 140 no longer acts on the carriage 110 to allow the carriage 110 to be urged in the direction of arrow Q by the force of the spring 132. The urging force of the spring 132 then causes the pin 118 to move as much as the above-stated difference (L−D) within the groove of the lead-screw bar 116 and thus come to a position which is shown in FIG. 11. Then, with the electromagnet 150 energized, the carriage 110, that is, the head, is instantly moved to the adjacent track. The time required for moving the head by energizing the electromagnet 150 is of course shorter than the time required for one rotation of the magnetic disc (about 16.67 ms in the case of a 2-inch floppy disc). After the head is moved to the adjacent track, the second field video signal is recorded. The embodiment of course immediately comes back to the condition of FIG. 8 when the power supply to the electromagnet 150 is turned off.

In cases where the heads of two channels are used and it is desired to instantly move them as much as a two-track-pitch distance, the embodiment can be easily modified by simply changing the dimension of the diameter D of the pin 118 to make the difference (L−D) correspond to the two-track-pitch distance.

As apparent from the description given above of the simple structural arrangement, the embodiment permits the head not only to be precisely moved to a predetermined distance point but also to be moved at a high speed.

What is claimed is:
1. A disc drive device comprising:
 a) a head arranged to perform recording or reproduction on a disc-shaped recording medium;
 b) a head carriage arranged to change a recording or reproducing track from one track to another by radially moving said head over said disc-shaped recording medium while said disc is rotating;
 c) driving means for moving said head carriage; and
 d) head support means for carrying said head, said head support means being mounted on said head carriage with moving means which is arranged to be capable of moving said head relative to said head carriage as much as a distance corresponding to a predetermined pitch of recording or reproducing tracks on said recording medium.

2. A device according to claim 1, wherein said head support means is arranged to be movable only a distance corresponding to one track pitch.

3. A device according to claim 2, wherein said head is a field recording head.

4. A device according to claim 3, wherein said head support means is arranged to move said head, relative to said head carriage, as much as a distance corresponding to one track pitch in moving said head from one track to an adjacent track, so that frame recording can be accomplished without moving said head carriage.

5. A disc drive device comprising:
a) a head arranged to perform recording or reproduction on a disc-shaped recording medium;
b) a head carriage arranged to change a recording or reproducing track from one track to another by radially moving said head over said disc-shaped recording medium while said disc is rotating; and
c) head support means for carrying said head, said head support means being mounted on said head carriage with moving means which is arranged to be capable of moving said head relative to said head carriage as much a distance corresponding to a predetermined pitch of recording or reproducing tracks on said recording medium, said head support means being urged to move in one direction by a spring, and
d) driving means arranged to move said head support means relative to said head carriage.

6. A device according to claim 5, wherein said driving means is an electromagnet.

7. A device according to claim 5, wherein said driving means is a cam member arranged to move said head support means.

8. A disc drive device comprising:
a) a head carriage having a head mounted thereon and arranged to be movable in a predetermined direction relative to a disc-shaped recording medium;
b) a lead-screw bar having a groove arranged therein to engage an engaging part disposed on said head carriage in a direction interacting with said lead-screw bar, said groove being arranged to allow the engaging part of said head carriage to have a gap of a predetermined distance within said groove; and
c) biasing means for biasing the engaging part of said head carriage for moving said head in the axial direction of said lead-screw bar selectively to one of two end faces of said groove of said lead-screw bar within said groove in the axial direction of said lead-screw bar.

9. A disc drive device comprising:
a) a head carriage having a head mounted thereon and arranged to be movable in a predetermined direction relative to a disc-shaped recording medium;
b) head positioning means arranged to move said head carriage in a first direction by engaging an engaging part disposed on said head carriage in a second direction intersecting said first direction, said head positioning means being provided with a plurality of engaging faces for engaging the engaging part of said head carriage; and c) selecting means for selectively changing the engaging face of said head positioning means from one of said engaging faces.

10. A device according to claim 9, wherein said head positioning means is a lead-screw bar, and wherein said engaging faces are inner side faces of a groove formed in the circumferential face of said lead-screw bar.

11. A device according to claim 10, wherein the width of the groove of said lead-screw bar is an integer times as wide as the pitch of recording tracks formed on said recording medium.

12. A head advancing control device comprising:
a) first head moving means for moving a head to a desired track on a recording medium;
b) second head moving means for moving said head to a track adjacent to said desired track on said recording medium;
c) first control means for controlling said first head moving means for positioning said head relative to said desired track in such a way as to have a reproduced signal obtained at the maximum level thereof; and
c) second control means for controlling said second head moving means for positioning said head to said track adjacent to said desired track and for stopping the operation of said first control means, after positioning of said head adjacent to said desired track.

13. A device according to claim 12, wherein said control means is arranged such that, in a case where one unit of recording information is recorded in a plurality of tracks on said recording medium, said control means allows said head position control means to operate at least for one of said plurality of tracks and renders said head position control means inoperative for another track adjacent to said one of plurality of tracks.

14. A device according to claim 13, wherein said head is a field head, and wherein said head position control means is arranged to operate for one of frame-recording tracks and does not operate for the other.

15. A disc drive device comprising:
a) a head arranged to perform recording or reproduction on a disc-shaped recording medium;
b) a head carriage arranged to change a recording or reproducing track from one track to another by radially moving said head over said disc-shaped recording medium while said disc is rotating;
c) driving means for moving said head carriage;
d) head support means for carrying said head, said head support means being mounted on said head carriage with moving means which is arranged to be capable of moving said head relative to said head carriage as much as a distance corresponding to a predetermined pitch of recording or reproducing tracks on said recording medium;
e) head position control means for controlling the position of said head relative to said desired track in such a way as to have a reproduced signal obtained at the maximum level thereof; and
f) control means for stopping said head position control means from operating when said head is to be moved to a track adjacent to a track for which the position of said head has been controlled by said head position control means, said control means being arranged to then cause said head to be moved by said head support means.

16. A device according to claim 15, wherein said head support means is arranged to move said head, relative to said head carriage, as much as a distance corresponding to one track pitch in moving said head from one track to an adjacent track, so that frame recording can be accomplished without moving said head carriage.

* * * * *